(12) United States Patent
Schumacher (10) Patent No.: US 10,843,588 B2
(45) Date of Patent: Nov. 24, 2020

(54) METHOD AND SYSTEM FOR POWER MANAGEMENT USING A POWER CONVERTER IN TRANSPORT

(71) Applicant: THERMO KING CORPORATION

(72) Inventor: Ryan Wayne Schumacher, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/730,143

(22) Filed: Dec. 30, 2019

(65) Prior Publication Data
US 2020/0130532 A1   Apr. 30, 2020

Related U.S. Application Data

(63) Continuation of application No. 15/630,098, filed on Jun. 22, 2017, now Pat. No. 10,518,662.

(51) Int. Cl.
*B60L 58/20* (2019.01)
*H02M 1/42* (2007.01)
*H02M 7/797* (2006.01)
*H02M 7/219* (2006.01)
*H02J 3/18* (2006.01)
(Continued)

(52) U.S. Cl.
CPC .......... *B60L 58/20* (2019.02); *B60H 1/00428* (2013.01); *B60H 1/3232* (2013.01); *B60L 1/003* (2013.01); *B60L 3/0061* (2013.01); *B60L 3/0092* (2013.01); *B60L 7/14* (2013.01); *B60L 8/003* (2013.01); *H02J 3/18* (2013.01); *H02J 3/50* (2013.01); *H02M 1/4216* (2013.01); *H02M 1/4225* (2013.01); *H02M 7/219* (2013.01);
(Continued)

(58) Field of Classification Search
CPC ........ B60L 1/003; B60L 58/20; B60L 3/0061; B60L 3/0092; B60L 7/14; B60L 8/003; H02J 3/18; H02J 3/50; H02M 1/4216; H02M 1/4225; H02M 7/219; H02M 7/797; F25B 27/00; F25B 2327/001
See application file for complete search history.

(56) References Cited

U.S. PATENT DOCUMENTS 6,622,505 B2   9/2003   Anderson et al.
7,250,742 B2   7/2007   Li
(Continued)

FOREIGN PATENT DOCUMENTS

EP   2629410   8/2013

OTHER PUBLICATIONS

Extended European Search Report, cited in the corresponding European Patent Application No. 18178415.8, dated Nov. 15, 2018, 11 pages.

*Primary Examiner* — Emily P Pham
(74) *Attorney, Agent, or Firm* — Hamre, Schumann, Mueller & Larson, P.C.

(57) ABSTRACT

Methods and systems for power management using a power converter in transport are provided. In one embodiment, the method includes monitoring a varying AC input to the power converter. The method also includes calculating a power factor adjustment based on the monitored varying AC input. Also, the method includes a power converter controller adjusting the power converter based on the calculated power factor adjustment to cause the power converter to supply a reactive current to a varying AC load.

20 Claims, 4 Drawing Sheets

(51) Int. Cl.
  *H02J 3/50*    (2006.01)
  *B60H 1/32*   (2006.01)
  *B60L 1/00*    (2006.01)
  *B60H 1/00*   (2006.01)
  *B60L 3/00*    (2019.01)
  *B60L 7/14*    (2006.01)
  *B60L 8/00*    (2006.01)
  *F25B 27/00*   (2006.01)

(52) U.S. Cl.
  CPC ............. *H02M 7/797* (2013.01); *F25B 27/00* (2013.01); *F25B 2327/001* (2013.01)

(56) References Cited

U.S. PATENT DOCUMENTS

| | | |
|---|---|---|
| 7,683,568 B2 | 3/2010 | Pande et al. |
| 7,957,166 B2 | 6/2011 | Schnetzka et al. |
| 8,330,293 B2 | 12/2012 | Brown et al. |
| 9,385,588 B2 | 7/2016 | Huomo |
| 9,413,225 B2 | 8/2016 | Castelli et al. |
| 2006/0066113 A1 | 3/2006 | Ebrahim et al. |
| 2007/0012492 A1 | 1/2007 | Deng et al. |
| 2008/0013351 A1 | 1/2008 | Alexander |
| 2010/0019740 A1 | 1/2010 | Hashimoto et al. |
| 2010/0171364 A1 | 7/2010 | Awwad |
| 2011/0071695 A1 | 3/2011 | Kouroussis et al. |
| 2012/0008351 A1 | 1/2012 | Yonezawa et al. |
| 2012/0212191 A1* | 8/2012 | Yuzurihara ......... H02M 1/4208 323/205 |
| 2014/0103727 A1 | 4/2014 | Taimela et al. |
| 2014/0126251 A1 | 5/2014 | Fujisaki et al. |
| 2014/0203755 A1 | 7/2014 | Becerra et al. |
| 2015/0354870 A1 | 12/2015 | Lee et al. |
| 2016/0311294 A1 | 10/2016 | Swab |
| 2016/0315575 A1 | 10/2016 | Yamamoto et al. |
| 2017/0033681 A1 | 2/2017 | Wen et al. |
| 2017/0302159 A1* | 10/2017 | Green ..................... H02P 5/74 |

\* cited by examiner

METHOD AND SYSTEM FOR POWER MANAGEMENT USING A POWER CONVERTER IN TRANSPORT

FIELD

The embodiments described herein are directed to power management for systems in transport. More particularly, the embodiments described herein relate to methods and systems for power management using a power converter in transport.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the TRS can include multiple devices that require varying AC or DC power to operate and a TRS power management system for providing power to these devices. Some of these devices may act as inductive loads that run at a lagging power factor. This can result in the TRS power management system operating with the current not in phase with the voltage which can lead to a higher than normal electrical current draw and inefficient transfer of electrical power.

SUMMARY

The embodiments described herein are directed to power management for systems in transport. More particularly, the embodiments described herein relate to methods and systems for power management using a power converter in transport.

In particular, the embodiments described herein can adjust a power factor based on varying AC and DC load requirements and varying AC and/or DC power entering the system.

The embodiments described herein can accommodate for inductive or reactive loads and sources that can create power efficiency losses in the power management system without an additional power factor correction circuit (e.g., a capacitor bank, etc.). For example, an inductive load (e.g., a transformer, an induction machine, etc.) can have a lagging current that requires reactive current for magnetization. A power supply can source the apparent power which includes a real power current and a reactive power current. The higher level of current (summation of reactive power current and real power current) from a lagging power factor can create inefficiency in system power transfer.

Accordingly, the embodiments described herein can improve power efficiency of the power management system in transport. In some embodiments, this can create fuel savings for the power management system when the electrical power is derived from a generator driven by a prime mover (e.g., an engine). Also, in some embodiments, this can ensure that the power management system meets regulations for power factor correction. Further, the embodiments described herein can provide a power management system with higher reliability and at a lower cost by using an already existing power converter and thus preventing the need for additional components such as an automotive style alternator with brushes.

In one embodiment, a method for power management using a power converter in transport is provided. The method includes monitoring a varying AC input to the power converter. The method also includes calculating a power factor adjustment based on the monitored varying AC input. Also, the method includes a power converter controller adjusting the power converter based on the calculated power factor adjustment to cause the power converter to supply a reactive current to a varying AC load.

In another embodiment, a power management system for use in transport is provided. The system includes an AC distribution network, a varying AC load, and a power converter. The AC distribution network is configured to receive power from a power source. Also, the AC distribution network is further configured to distribute a varying AC power signal. The varying AC load receives the varying AC power signal from the AC distribution network. The power converter is configured to receive the varying AC power signal from the AC distribution network, convert the varying AC power signal into a DC power signal, and supply the DC power signal to a varying DC load. Also, the power converter includes a power converter controller that is configured to control operation of the power converter. The power management system is configured to monitor a varying AC input to the power converter and calculate a power factor adjustment based on the monitored varying AC input. Also, the power converter controller is configured to adjust the power converter based on the calculated power factor adjustment to cause the power converter to supply a reactive current to the varying AC load.

In yet another embodiment, a transport refrigeration system (TRS) is provided. The transport refrigeration system includes a refrigeration circuit, a transport refrigeration system controller, and a power management system. The refrigeration circuit includes a compressor. The transport refrigeration system controller is configured to control operation of the transport refrigeration system. The power management system provides power to the transport refrigeration system. The power management system includes an AC distribution network, a varying AC load, and a power converter. The AC distribution network is configured to receive power from a power source. Also, the AC distribution network is further configured to distribute a varying AC power signal. The varying AC load receives the varying AC power signal from the AC distribution network. The power converter is configured to receive the varying AC power signal from the AC distribution network, convert the varying AC power signal into a DC power signal, and supply the DC power signal to a varying DC load. The power converter includes a power converter controller that is configured to control operation of the power converter. One of the transport refrigeration system controller and the power converter controller is configured to monitor a varying AC input to the power converter. Also, one of the transport refrigeration system controller and the power converter controller is configured to calculate a power factor adjustment based on the monitored varying AC input. The power converter controller is configured to adjust the power converter based on the calculated power factor adjustment to cause the power converter to supply a reactive current to the varying AC load.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

The embodiments described herein are directed to power management for systems in transport. More particularly, the embodiments described herein relate to methods and systems for power management using a power converter in transport.

In particular, the embodiments described herein can adjust a power factor based on varying AC and DC load requirements and varying AC and/or DC power entering the system.

The embodiments described herein can accommodate for inductive or reactive loads and sources that can create power efficiency losses in the power management system without additional power factor correction circuit (e.g., a capacitor bank, etc.). For example, an inductive load (e.g., a transformer, an induction machine, etc.) can have a lagging current that requires reactive power for magnetization. The reactive current required can get very high for lightly loaded machines. The added current for reactive power can create power losses in the power management system because current and voltage are not in phase and because the current may not be sinusoidal.

Accordingly, the embodiments described herein can improve power efficiency of the power management system in transport. In some embodiments, this can create fuel savings for the power management system. Also, in some embodiments, this can ensure that the power management system meets regulations for power quality. Further, the embodiments described herein can provide a power management system with higher reliability and at a lower cost by using an already existing power converter and thus preventing the need for additional components such as an automotive style alternator with brushes.

Figure 1:
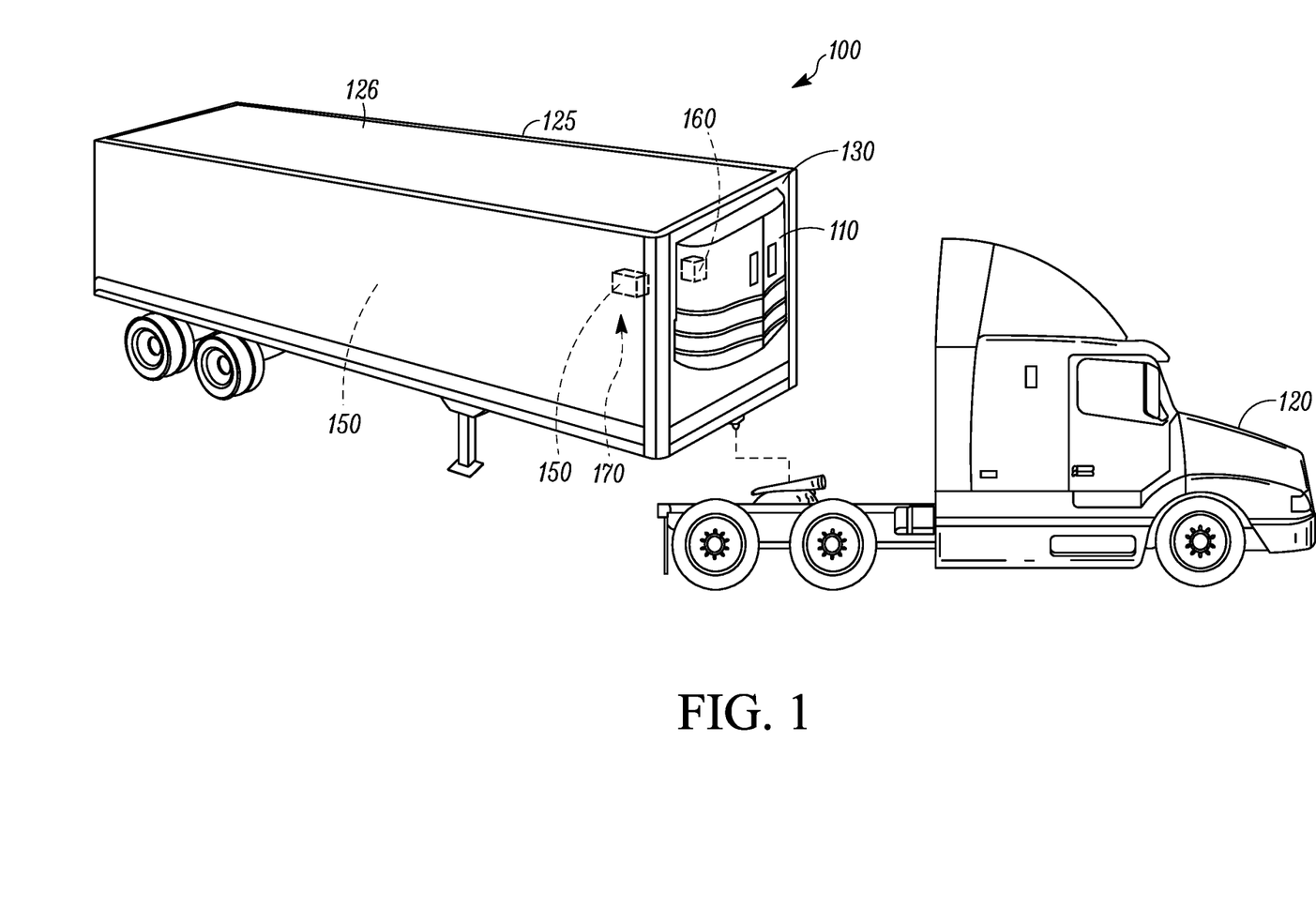
FIG. 1 illustrates a TRS for a transport unit that is attached to a tractor, according to one embodiment.

FIG. 1 illustrates one embodiment of a TRS 100 for a transport unit (TU) 125 that is attached to a tractor 120. The TRS 100 includes a transport refrigeration unit (TRU) 110 that provides environmental control (e.g. temperature, humidity, air quality, etc.) within an internal space 150 of the TU 125. The TRS 100 also includes a TRS controller 170 and one or more sensors (not shown) that are configured to measure one or more parameters of the TRS 100 and communicate parameter data to the TRS controller 170.

The TRU 110 is disposed on a front wall 130 of the TU 125. In other embodiments, it will be appreciated that the TRU 110 can be disposed, for example, on a rooftop 126 or another wall of the TU 125. The tractor 120 is attached to and is configured to tow the transport unit 125. It will be appreciated that the embodiments described herein are not limited to trucks and trailer units, but can apply to any other type of transport unit (e.g., a container on a flat car, an intermodal container, etc.), a truck, a box car, or other similar transport unit.

The programmable TRS Controller 170 may comprise a single integrated control unit 160 or may comprise a distributed network of TRS control elements 160, 165. The number of distributed control elements in a given network can depend upon the particular application of the principles described herein. The TRS controller 170 is configured to control operation of the TRS 100. The TRS controller 170 may also regulate the operation of the TRS 100 to prevent overloading a power source, e.g. a diesel engine, during an operational mode change of the TRS as described in more detail below.

The TRS 100 can be powered by one or more power sources (not shown) including, for example, a prime mover (e.g., diesel engine), shore power, a fuel cell, solar power panel, etc. In some embodiments, one or more of the power sources (e.g., a prime mover, a fuel cell, etc.) can be disposed within the TRU 110. In other embodiments, one or more of the power sources can be separate from the TRU 110 and disposed within the tractor 125 (e.g., a prime mover for moving the tractor 120, etc.) or TRU 125. Further, in some embodiments, one or more of the power sources can be on or within the TU 120 (e.g., a solar power panel, etc.). Also, in some embodiments, one or more of the power sources can be outside of the TRU 110, the TU 120 and the tractor 125 (e.g., shore power, etc.)

When the power source includes a diesel engine, the diesel engine can be less than a 25 horse power engine. Also, the diesel engine can be a two speed engine, a variable speed engine, etc. In some instances, the power source can be required to not exceed a predefined power level. Exceeding the predefined power level can, for example, prevent the power source from overloading, can prevent the power source from exceeding, for example, government or customer requirements (e.g., noise level regulations, emission regulations, fuel usage limits, etc.).

Figure 2:
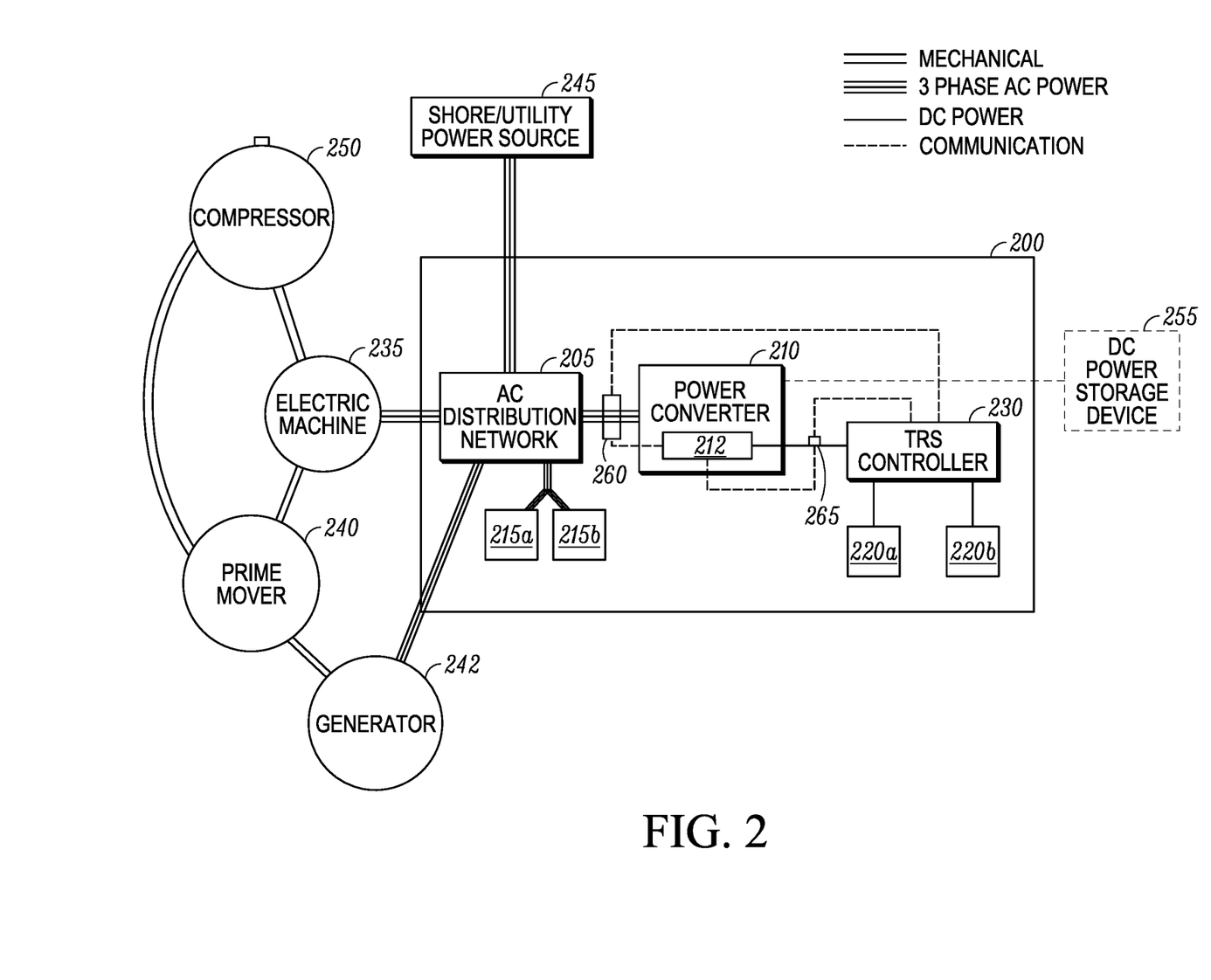
FIG. 2 illustrates a block diagram schematic of a power management system for powering a TRS, according to one embodiment.

FIG. 2 illustrates a block diagram schematic of one embodiment for a power management system 200 for powering a TRS (e.g., the TRS 100 shown in FIG. 1). The system 200 includes an AC distribution network 205, a power converter 210, a plurality of varying AC loads 215a,b, a plurality of varying DC loads 220a,b, a TRS controller 230, a power converter input sensor 260 and a power converter output sensor 265.

As shown in FIG. 2, the AC distribution network 205 of the system 200 is configured to receive three phase AC power from an electric machine 235 excited by the AC distribution network 205 and powered by a prime mover 240 (for example when the TRS is in transport), a generator 242 powered by the prime mover 240 (for example when the TRS is in transport), and/or from a shore/utility power source 245 (for example when the TRS is not in transport).

The prime mover 240 can be, for example, a diesel engine, a compressed natural gas engine, etc. In some embodiments, the prime mover 240 may generate power for the power management system 200 as well as other loads. For example, in one embodiment, the prime mover 240 may be primarily used for operating a vehicle and the power management system 200 may only obtain variable amounts of power from the prime mover 240 based on the power required for operating the vehicle. In some embodiments, the prime mover 240 may be disposed in a TRU (e.g., the TRU 110 shown in FIG. 1) of the TRS. In some embodiments, the prime mover 240 may be disposed in a tractor/truck that provides transport for the TRS.

The electric machine 235 can be and/or include, for example, an induction machine (e.g., an asynchronous induction machine), a motor, etc. The generator 242 can be and/or include, for example, a permanent magnet machine.

It will be appreciated that in other embodiments, one or more of the electric machine 235, the generator 242, the prime mover 240 and the compressor 240 can be part of the system 200.

The AC distribution network 205 is configured to direct three phase AC power to the power converter 210 and the plurality of varying AC loads 215*a,b*. When the system 200 is powered by the prime mover 240, three phase AC power can be supplied to the power converter 210 and the plurality of varying AC loads 215*a,b* by the generator 242 (via the AC distribution network 205) that is driven using mechanical energy of the prime mover 240. When the system 200 is powered by the shore/utility power source 245, three phase AC power can be supplied to the power converter and the plurality of varying AC loads 215*a,b* by the shore/utility power source 245 and can also be supplied to a motor such as the electric machine 235 to mechanically drive the compressor 250. It will be appreciated that since the AC distribution network 205 is connected to an input of the power converter 210, the power converter 210 can influence power sent from the AC distribution network 205 to the plurality of varying AC loads 215*a,b*.

The plurality of varying AC loads 215*a,b* can include, for example, one or more induction machines, one or more resistor grids, one or more condenser fans, one or more evaporator blowers, a drain tube heater, etc. It will be appreciated that the power drawn by each of the plurality of varying AC loads 215*a,b* can vary over time based on, for example, needs and operation of the TRS. Also, it will be appreciated that any of the plurality of varying AC loads 215*a,b* have a leading or lagging power factor.

The TRS controller 230 is an electronic device that is configured to manage, command, direct, and regulate the behavior of one or more TRS refrigeration components of a refrigeration circuit (e.g., an evaporator, a condenser, the compressor 250, an expansion valve (EXV), an electronic throttling valve (ETV), etc.), the plurality of varying AC loads 215*a,b*, the plurality of varying DC loads 220*a,b*, electric machine 235, etc. Although not shown, the TRS controller 230 is also configured to communicate with the power converter controller 210 for providing power management for the TRS.

The compressor 250 is a refrigerant compressor that compresses refrigerant for use in, for example, a refrigeration circuit. The compressor 250 shown in FIG. 2 is a mechanically driven compressor. Mechanical power can be delivered to the compressor 250 from the prime mover 240 and/or the electric machine 235. It will be appreciated that in some embodiments, the compressor 250 can be an electrically driven compressor. In these embodiments, the compressor 250 can receive electric power from, for example, the AC distribution network 205.

The power converter 210 is configured to receive three phase AC power from shore/utility power source 245 and/or the combination of the prime mover 240 and the electric machine 235 and/or the combination of the prime mover 240 and the generator 242. The power converter 210 is configured to convert the received three phase AC power into DC power and supply the DC power to the varying DC loads 220 via the TRS controller 230. While the embodiment shown in FIG. 2 shows the power converter 210 supplying DC power to the plurality of varying DC loads 220 via the TRS controller 230, it will be appreciated that in other embodiments the power converter 210 can supply DC power to one or more of the plurality of varying DC loads 220 without passing through the TRS controller 230. In some embodiments, the power converter 210 can also supply DC power to an optional DC power storage device 255. The power converter 210 is controlled by a power converter controller 212.

It will be appreciated that the three phase AC power received by the power converter 210 is a varying three phase AC power signal that can vary over time based on, for example, changing load requirements from the plurality of varying AC loads 215*a,b*, changing three phase AC power supplied by the electric machine (e.g., because of changing load requirements from the compressor 250, changing power generated by the prime mover 240, etc.).

The power converter 210 is also configured to supplement three phase AC current provided by the electric machine 235, the shore/utility power source 245, and/or the generator 242 to the varying AC loads 215*a,b* with reactive three phase AC current to help reduce power efficiency losses.

Figure 3:
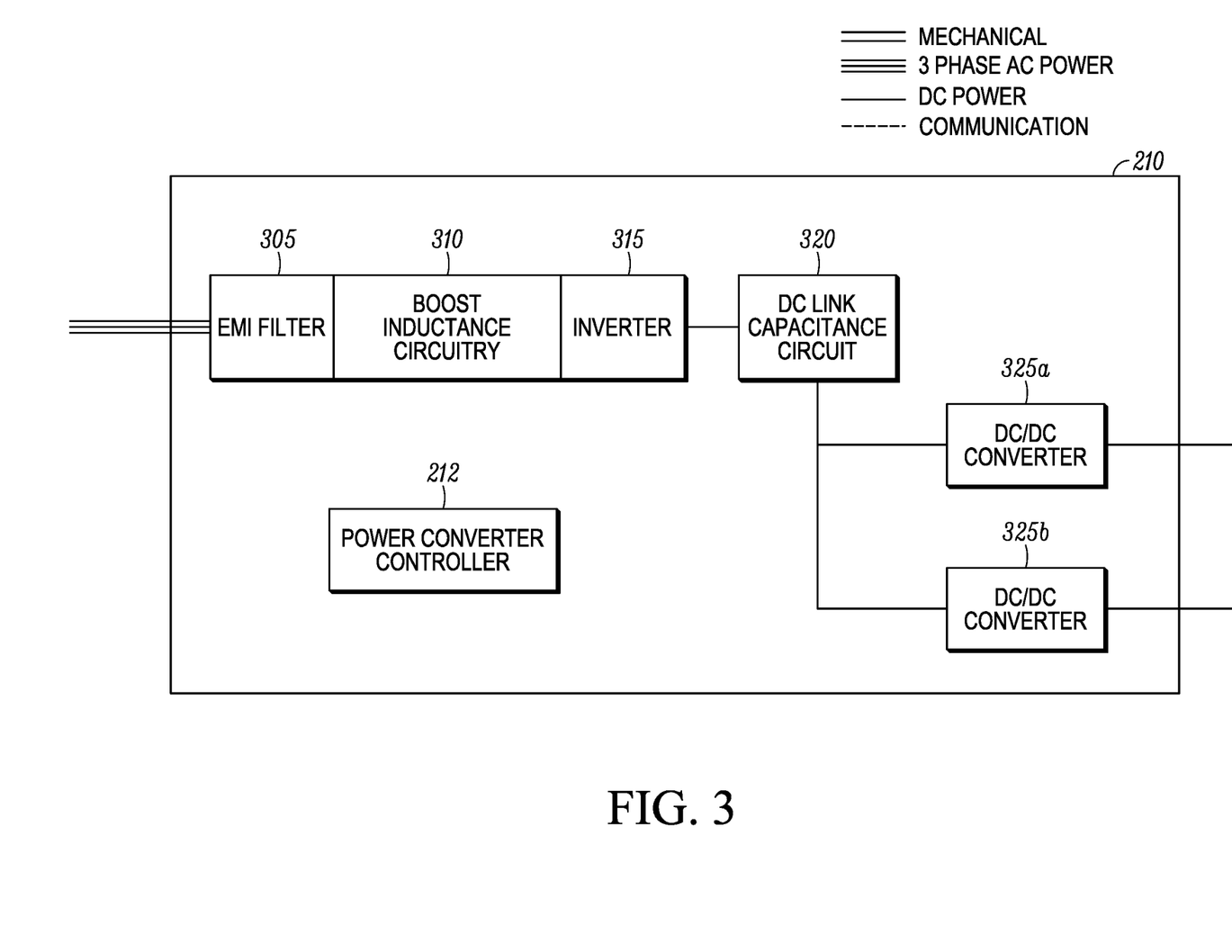
FIG. 3 illustrates a block diagram schematic of a power converter, according to one embodiment.

FIG. 3 illustrates a block diagram schematic of the power converter 210 according to one embodiment. The power converter 210 includes the power converter controller 212, an electromagnetic interference (EMI) filter 305, a boost inductance circuit 310, an inverter 315, a DC link capacitance circuit 320, and a plurality of DC/DC voltage converters 325*a,b*. In some embodiments, the power converter 210 can also include one or more DC/AC converters (not shown).

A three phase AC power signal is supplied to the power converter 210 and the EMI filter 305 is configured to remove EMI from the three phase AC power signal. In one example, the power converter 210 can receive a three phase AC power signal in a range of, for example, about 180 $V_{RMS}$ to about 506 $V_{RMS}$ and the EMI filter 350 can remove EMI from the three phase AC power signal and output a filtered 180 $V_{RMS}$ to about 506 $V_{RMS}$ three phase AC power signal to the boost inductance circuit 310 or the inverter 315.

The boost inductance circuit 310 is configured to boost voltage of the filtered three phase AC power signal as required to stabilize the DC link capacitance circuit 320. In particular, the boost inductance circuit 310 can store energy and limit the distortion of the three phase AC power signal. In some embodiments, the boost inductance circuit 310 can make use of a potential winding and/or inductance of the electric machine 235 to boost the voltage. The three phase AC power signal is then passed through the inverter 315.

The inverter 315 is configured to stabilize and convert the filtered and stabilized boosted three phase AC power signal into a DC power signal. In one example, the inverter 315 can stabilize and convert the filtered and potentially boosted three phase AC power signal in a range of, for example, about 180 $V_{RMS}$ to about 506 $V_{RMS}$ into an about 800 V DC power signal.

In some embodiments, the inverter 315 includes an Active Front End (AFE) rectifier, a Power Factor Correction (PFC) circuit, an inverter with boost inductance circuit, and/or an active rectifier that stabilize the three phase AC power signal while converting the three phase AC power signal into a DC power signal. In some embodiments, the inverter 315 can include a plurality of transistor pairs in parallel that can be controlled (e.g., turned ON or OFF) by the power converter controller 212 to provide power factor correction to the filtered and potentially boosted three phase AC power signal as it is converted into a DC power signal. The DC power signal is then sent to the DC link capacitance circuit 320.

The DC link capacitance circuit 320 is configured to source DC power to one or more of the DC/DC converters 325*a,b* and/or one or more DC/AC converters. The DC link capacitance circuit 320 also acts as energy storage for the power converter 210. The power converter 210 can use the energy storage to affect operation of the AC distribution network 205. The DC link capacitance circuit 320 can include internal capacitance (e.g., a plurality of capacitors) that can provide a reactive power source that can be controlled by the inverter 315. The capacitance value of the DC link capacitance circuit 320 can be varied by the inverter 315 based on AC distribution network application requirements.

Each of the DC/DC converters 325a,b can independently reduce the voltage of the sourced DC power signal to a lower voltage for supplying power to various DC loads (e.g., the TRS controller 230, the varying DC loads 220a,b, and the optional DC power storage device 255 shown in FIG. 2). In one example, the DC/DC converter 325a can reduce one 400 V DC signal to a 48V DC signal while the DC/DC converter 325b can reduce the other 400 V DC signal to a 12 V DC signal. In another example, both of the DC/DC converters 325a,b can reduce the 40 V DC signals to 12 V DC signals.

The power converter controller 212 is configured to manage and control the power converter 210 including the inverter 315. As discussed in more detail below with respect to FIG. 4, the power converter controller 212 can control the inverter 315 to provide power factor correction based on monitored three phase AC power input to the power converter 210 and monitored DC power output from the power converter 210.

Returning to FIG. 2, in some embodiments the power converter 210 can be a battery charger that can provide DC power to the plurality of varying DC loads 220a,b and optionally the optional DC power storage device 245. The plurality of varying DC loads 220a,b can include, for example, one or more sensors, one or more third party devices, a telematics unit, a data logger device, charger for charging a battery, one or more solenoids, one or more DC powered motors, etc. It will be appreciated that the power drawn by each of the plurality of varying DC loads 220a,b can vary over time based on, for example, needs and operation of the TRS. The optional DC power storage device 245 can be, for example, one or more rechargeable batteries for providing DC power to one or more of the plurality of varying DC 220a,b and the TRS controller 230.

The power converter input sensor 260 is configured to monitor a varying AC input (e.g., a three phase AC power signal; a three phase AC current signal; a three phase AC voltage signal; etc.) from the AC distribution network 205 to the power converter 210. The power converter input sensor 260 is configured to send data indicative of the monitored AC input to the power converter controller 212 and the TRS controller 230. It will be appreciated that in some embodiments, the power converter input sensor 260 may only send data indicative of the monitored AC input to the power converter controller 212 or the TRS controller 230.

The power converter output sensor 265 is configured to monitor a varying DC output (e.g., a DC power signal; a DC current signal; a DC voltage signal; etc.) from the power converter 210 to the TRS controller 230. The power converter output sensor 265 is configured to send data indicative of the monitored DC output to the power converter controller 212 and the TRS controller 230. It will be appreciated that in some embodiments, the power converter output sensor 265 may only send data indicative of the monitored DC output to the power converter controller 212 or the TRS controller 230.

The system 200 can provide power to the varying AC loads 215a,b and the varying DC loads 220a,b in various ways.

For example, when the generator 242 is a permanent magnet machine, the prime mover 240 can provide mechanical power to the generator 242 and mechanical power to the compressor 250. The generator 242 can provide three phase AC power to the AC distribution network 205. As discussed in more detail below, the AC distribution network 205 can then provide three phase AC current from the generator 242 and reactive three phase AC current from the power converter 210 to provide three phase AC power to the varying AC loads 215a,b.

In another example, when the electric machine 235 is an induction machine, the power converter 210 can initially excite the electric machine 235 and then the prime mover 240 can provide mechanical power to the electric machine 235 and mechanical power to the compressor 250. The electric machine 235 can act as a generator and provide three phase AC power to the AC distribution network 205. As discussed in more detail below, the AC distribution network 205 can then provide three phase AC current from the generator 242 and reactive three phase AC current from the power converter 210 to provide three phase AC power to the varying AC loads 215a,b. In some embodiments, the power converter 210 can excite the electric machine 235 when, for example, the generator 242 is not available.

In another example, the shore/utility power source 245 can provide three phase AC power to the AC distribution network 205. As discussed in more detail below, the AC distribution network 205 can then provide three phase AC current from the shore/utility power source 245 and reactive three phase AC current from the power converter 210 to provide three phase AC power to the varying AC loads 215a,b. The shore/utility power source 245 can excite the electric machine 235 so that the electric machine can act as a drive motor to generate and provide mechanical power to the compressor 250.

The power converter controller 212 alone or in combination with the TRS controller 230 is configured to control the system 200 in order to provide power management in transport based on the data indicative of the monitored varying AC input and the data indicative of the monitored varying DC output. As the three phase AC power received by the power converter 210 and the DC power requirements (e.g., for the plurality of varying DC loads 220a,b, the TRS controller 230, the DC power storage device 255, etc.) can vary over time, the power converter 210 based on control of the power converter controller 212 can stabilize and convert the varying three phase AC signal into a DC power signal at peak efficiency. One embodiment for providing a method of power management to the system 200 is discussed below with respect to FIG. 4.

Figure 4:
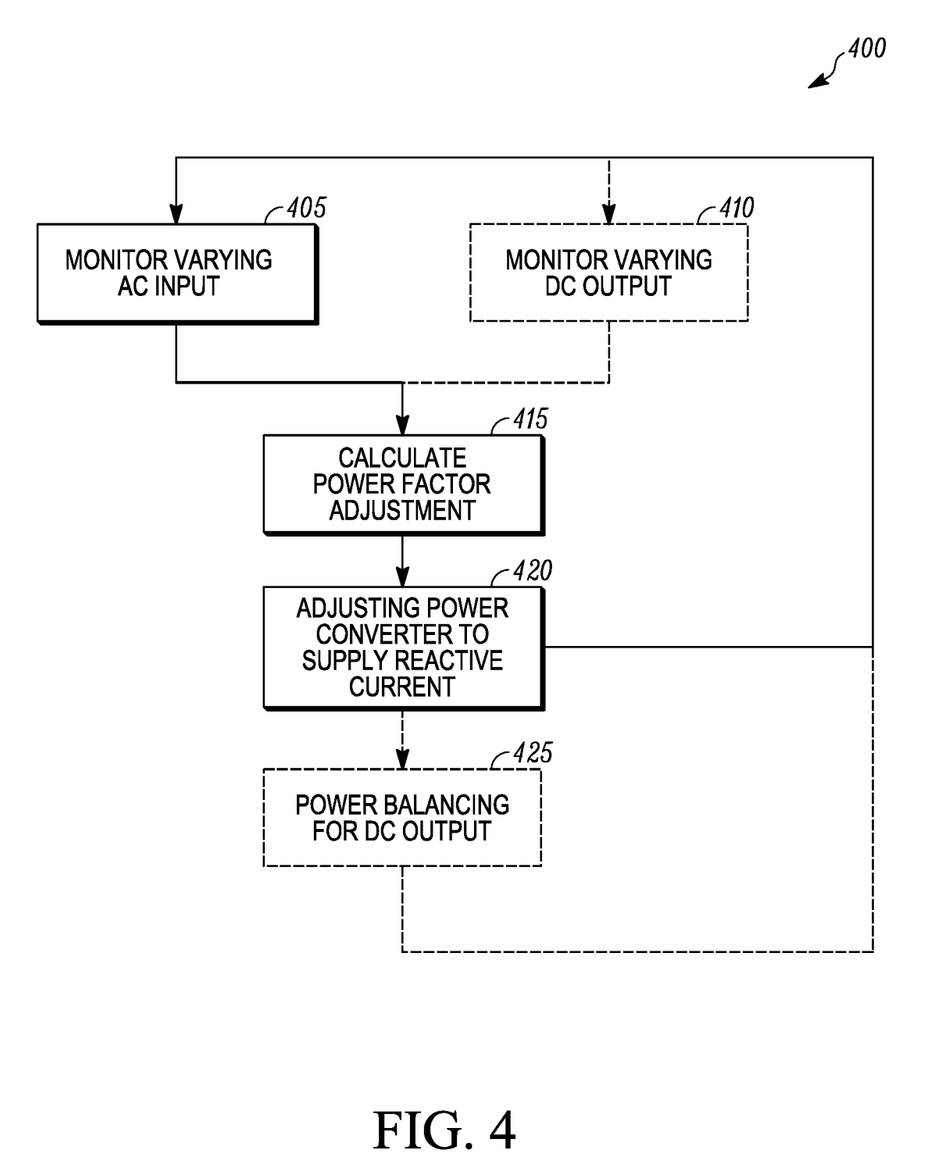
FIG. 4 illustrates a flowchart of a method for providing power management to a power management system in transport, according to one embodiment.

FIG. 4 illustrates a flowchart of a method 400 for providing power management to a power management system (e.g., the power management system 200 shown in FIG. 2) in transport, according to one embodiment. At 405, a sensor (e.g., the power converter input sensor 260) monitors a varying AC input (e.g., a three phase AC power signal; a three phase AC current signal; a three phase AC voltage signal; etc.) to a power converter (e.g., the power converter 210 shown in FIG. 2). The data indicative of the varying AC input to the power converter is sent to a controller (e.g., the power converter controller 212 and/or the TRS controller 230 shown in FIG. 2). The method 400 then proceeds to 415.

Optionally, at 410, a sensor (e.g., the power converter output sensor 265) monitors a varying DC output (e.g., a DC power signal; a DC current signal; a DC voltage signal; etc.) from the power converter. The data indicative of the varying DC output from the power converter is sent to a controller (e.g., the power converter controller 212 and/or the TRS controller 230 shown in FIG. 2). In some embodiments, the data indicative of the varying AC input to the power converter and the data indicative of the varying DC output from the power converter can be real-time data sent to the controller. In some embodiments, a sensor monitors a varying AC input to the power converter at 405 and a sensor monitors a varying DC output from the power converter at 410 concurrently.

At 415, the controller calculates a power factor adjustment based on the data indicative of the varying AC input to the power converter. The method 400 then proceeds to 420.

At 420, the controller instructs the power converter to adjust itself based on the calculated power factor adjustment to cause the power converter to supply a reactive current to one or more varying AC loads (e.g., the varying AC loads 215 shown in FIG. 2). That is, the power converter, based on the calculated power factor adjustment, can supply a sufficient amount of reactive current at an appropriate time to the one or more varying AC loads (e.g., the varying AC loads 215 shown in FIG. 2) so that the three phase AC current received by the one or more varying AC loads is closer to a unitary power factor. This can improve the power efficiency of the power management system. In some embodiments, the controller can instruct the power converter to change energy storage within a boost inductance circuit of the power converter (e.g., the boost inductance circuit 310 shown in FIG. 3). In some embodiments, the controller can instruct the power converter to change a capacitance value of a DC link capacitance circuit (e.g., the DC link capacitance circuit 320 shown in FIG. 3). In some embodiments, the controller can instruct an inverter (e.g., the inverter 315 shown in FIG. 3) to turn ON or OFF one or more of a plurality of transistors. The method 400 then returns to 405 and optionally to 410, or can optionally proceed to 425.

Optionally, at 425, the controller instructs the power converter to provide power balancing to the DC power signal outputted from the power converter. In some embodiments, the controller can instruct the power converter to change energy storage within a boost inductance circuit of the power converter (e.g., the boost inductance circuit 310 shown in FIG. 3) to stabilize the DC power signal. In some embodiments, the controller can instruct the power converter to change a capacitance value of a DC link capacitance circuit (e.g., the DC link capacitance circuit 320 shown in FIG. 3) to stabilize the DC power signal. In some embodiments, the controller can instruct an inverter (e.g., the inverter 315 shown in FIG. 3) to turn ON or OFF one or more of a plurality of transistors to stabilize the DC power signal. In some embodiments, the controller can adjust the output of one or more DC/DC converters (e.g., the DC/DC converters 325a,b) and/or one or more DC/AC converters to change power demands to balance requirements of the power converter and/or the power management system as a whole. Accordingly, the power converter supplies the updated DC power signal to one or more DC loads (e.g., the TRS controller 230; the plurality of varying DC loads 220a,b; the optional DC power storage device 255, etc.). In some embodiments, power balancing of the DC power signal can affect the reactive current sent to one or more varying AC loads. In some embodiments, adjusting the power converter based on the calculated power factor adjustment at 420 and power balancing the DC power signal at 425 occurs concurrently. The method 400 then returns to 405 and optionally to 410.

Accordingly, the method 400 can accommodate for inductive or reactive loads and sources that can create power efficiency losses in the power management system without additional power factor correction circuit (e.g., a capacitor bank, etc.). For example, an inductive load (e.g., a transformer, an induction machine, etc.) can have a lagging current that requires reactive power for magnetization. The added current for reactive power can create power losses in the power management system because current and voltage are not in phase.

Thus, the method 400 can improve power efficiency of the power management system in transport. In some embodiments, this can create fuel savings for the power management system. Also, in some embodiments, this can ensure that the power management system meets regulations for power quality. Further, the method 400 can provide a power management system with higher reliability and at a lower cost by preventing the need for additional components such as an automotive style alternator with brushes.

Aspects:

It is appreciated that any of aspects 1-8, 9-15 and 16-20 can be combined.

Aspect 1. A method for power management using a power converter in transport, the method comprising:
  monitoring a varying AC input to the power converter;
  calculating a power factor adjustment based on the monitored varying AC input; and
  a power converter controller adjusting the power converter based on the calculated power factor adjustment to cause the power converter to supply a reactive current to a varying AC load.

Aspect 2. The method of aspect 1, wherein adjusting the power converter based on the calculated power factor adjustment includes changing an energy storage within a boost inductance circuit of the power converter.

Aspect 3. The method of either of aspects 1 or 2, wherein adjusting the power converter based on the calculated power factor adjustment includes changing a capacitance value of a DC link capacitance circuit of the power converter.

Aspect 4. The method of any one of aspects 1-3, wherein adjusting the power converter based on the calculated power factor adjustment includes switching one or more of a plurality of transistors of an inverter of the power converter.

Aspect 5. The method of any one of aspects 1-4, wherein adjusting the power converter based on the calculated power factor adjustment includes adjusting the power factor closer to a unity power factor where a current of the varying AC power signal and a voltage of the varying AC power signal are in phase.

Aspect 6. The method of any one of aspects 1-5, wherein the varying AC input is a varying three phase AC current signal inputted to the power converter.

Aspect 7. The method of any one of aspects 1-5, wherein the varying AC input is a varying three phase AC power signal inputted to the power converter.

Aspect 8. The method of any one of aspects 1-7, further comprising:
  monitoring a varying DC output from the power converter; and
  the power converter controller power balancing the DC output from the power converter based on the monitored varying DC output.

Aspect 9. A power management system for use in transport, the system comprising:
  an AC distribution network that is configured to receive power from a power source, the AC distribution network further configured to distribute a varying AC power signal;

a varying AC load that receives the varying AC power signal from the AC distribution network; and a power converter that is configured to receive the varying AC power signal from the AC distribution network, convert the varying AC power signal into a DC power signal, and supply the DC power signal to a varying DC load, wherein the power converter includes a power converter controller that is configured to control operation of the power converter; and wherein the power management system is configured to monitor a varying AC input to the power converter and calculate a power factor adjustment based on the monitored varying AC input, and wherein the power converter controller is configured to adjust the power converter based on the calculated power factor adjustment to cause the power converter to supply a reactive current to the varying AC load.

Aspect 10. The power management system of aspect 9, wherein the power converter includes a boost inductance circuit, and wherein an energy storage of the boost inductance circuit is changed based on the calculated power factor adjustment.

Aspect 11. The power management system of either of aspects 9 or 10, wherein the power converter includes a DC link capacitance circuit, and wherein a capacitance value of the DC link capacitance circuit is changed based on the calculated power factor adjustment.

Aspect 12. The power management system of any one of aspects 9-11, wherein the power converter includes an inverter that includes a plurality of transistors, and wherein one or more of the plurality of transistors is switched based on the calculated power factor adjustment.

Aspect 13. The power management system of any one of aspects 9-12, wherein the varying AC input is one of a varying three phase AC current signal inputted to the power converter and a varying three phase AC power signal inputted to the power converter.

Aspect 14. The power management system of any one of aspects 9-13, further comprising a transport refrigeration system controller that is configured to control operation of a transport refrigeration system, wherein the transport refrigeration system controller is configured to monitor the varying AC input to the power converter and calculate the power factor adjustment based on the monitored varying AC input.

Aspect 15. The power management system of any one of aspects 9-13, wherein the power converter controller is configured to monitor the varying AC input to the power converter and calculate the power factor adjustment based on the monitored varying AC input.

Aspect 16. A transport refrigeration system comprising:
a refrigeration circuit that includes a compressor;
a transport refrigeration system controller that is configured to control operation of the transport refrigeration system; and
a power management system that provides power to the transport refrigeration system, wherein the power management system includes:
an AC distribution network that is configured to receive power from a power source, the AC distribution network further configured to distribute a varying AC power signal,
a varying AC load that receives the varying AC power signal from the AC distribution network, and
a power converter that is configured to receive the varying AC power signal from the AC distribution network, convert the varying AC power signal into a DC power signal, and supply the DC power signal to a varying DC load, wherein the power converter includes a power converter controller that is configured to control operation of the power converter, wherein one of the transport refrigeration system controller and the power converter controller is configured to monitor a varying AC input to the power converter, wherein one of the transport refrigeration system controller and the power converter controller is configured to calculate a power factor adjustment based on the monitored varying AC input, wherein the power converter controller is configured to adjust the power converter based on the calculated power factor adjustment to cause the power converter to supply a reactive current to the varying AC load.

Aspect 17. The transport refrigeration system of aspect 16, wherein the power converter includes a boost inductance circuit, and wherein an energy storage of the boost inductance circuit is changed based on the calculated power factor adjustment.

Aspect 18. The transport refrigeration system of either of aspects 16 or 17, wherein the power converter includes a DC link capacitance circuit, and wherein a capacitance value of the DC link capacitance circuit is changed based on the calculated power factor adjustment.

Aspect 19. The transport refrigeration system of any one of aspects 16-18, wherein the power converter includes an inverter that includes a plurality of transistors, and wherein one or more of the plurality of transistors is switched based on the calculated power factor adjustment.

Aspect 20. The transport refrigeration system of any one of aspects 16-19, wherein the varying AC input is one of a varying three phase AC current signal inputted to the power converter and a varying three phase AC power signal inputted to the power converter.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for power management using a power converter in transport, the method comprising:
an AC distribution network receiving power from a power source;
the AC distribution network distributing an AC power or current signal based on the power received from the power source to a load;
a power converter receiving the AC power or current signal from the AC distribution network;
a power management system monitoring the AC power or current signal to the power converter;
the power management system calculating a power factor adjustment based on the AC power or current signal to the power converter;

a power converter controller adjusting the power converter based on the calculated power factor adjustment to cause the power converter to supply a reactive current to the load; and the load receiving the AC power or current signal in addition to the reactive current.

2. The method of claim 1, wherein said adjusting the power converter based on the calculated power factor adjustment includes changing an energy storage within a boost inductance circuit of the power converter.

3. The method of claim 1, wherein said adjusting the power converter based on the calculated power factor adjustment includes changing a capacitance value of a DC link capacitance circuit of the power converter.

4. The method of claim 1, wherein said adjusting the power converter based on the calculated power factor adjustment includes switching one or more of a plurality of transistors of an inverter of the power converter.

5. The method of claim 1, wherein said adjusting the power converter based on the calculated power factor adjustment includes adjusting the power factor closer to a unity power factor where a current of the AC power or current signal and a voltage of the AC power or current signal are in phase.

6. The method of claim 1, wherein the AC power or current signal is one of a three phase AC power signal inputted to the power converter and a three phase AC current signal inputted to the power converter.

7. The method of claim 1, further comprising:
the power converter converting the AC power or current signal into a DC output;
the power converter supplying the DC output to a second load;
monitoring the DC output from the power converter to the second load; and
the power converter controller power balancing a DC power signal from the power converter based on the DC output.

8. The method of claim 1, further comprising the power converter exciting an electric machine that supplies the power to the AC distribution network.

9. A power management system for use in transport, the power management system comprising:
an AC distribution network that is configured to receive power from a power source, the AC distribution network further configured to distribute an AC power or current signal based on the power received from the power source to a load; and
a power converter that is configured to receive the AC power or current signal from the AC distribution network, wherein the power converter includes a power converter controller that is configured to control operation of the power converter, wherein the power management system is configured to monitor the AC power or current signal to the power converter and calculate a power factor adjustment based on the monitored AC power or current signal, and wherein the power converter controller is configured to adjust the power converter based on the calculated power factor adjustment to cause the power converter to supply a reactive current to the load such that the load receives the reactive current in addition to the AC power or current signal.

10. The power management system of claim 9, wherein the power converter includes a boost inductance circuit, and wherein an energy storage of the boost inductance circuit is changed based on the calculated power factor adjustment.

11. The power management system of claim 9, wherein the power converter includes a DC link capacitance circuit, and wherein a capacitance value of the DC link capacitance circuit is changed based on the calculated power factor adjustment.

12. The power management system of claim 9, wherein the power converter includes an inverter that includes a plurality of transistors, and wherein one or more of the plurality of transistors is switched based on the calculated power factor adjustment.

13. The power management system of claim 9, wherein the AC power or current signal is one of a three phase AC current signal inputted to the power converter and a three phase AC power signal inputted to the power converter.

14. The power management system of claim 9, further comprising a transport refrigeration system controller that is configured to control operation of a transport refrigeration system, wherein the transport refrigeration system controller is configured to monitor the AC power or current signal to the power converter and calculate the power factor adjustment based on the monitored AC power or current signal.

15. The power management system of claim 9, wherein the power converter is configured to adjust the power factor closer to a unity power factor where a current of the AC power or current signal and a voltage of the AC power or current signal are in phase.

16. The power management system of claim 9, wherein the power converter is configured to excite an electric machine that supplies the power to the AC distribution network.

17. A transport refrigeration system comprising:
a refrigeration circuit that includes a compressor;
a transport refrigeration system controller that is configured to control operation of the transport refrigeration system; and
a power management system that provides power to the transport refrigeration system, wherein the power management system includes:
an AC distribution network that is configured to receive power from a power source, the AC distribution network further configured to distribute an AC power or current signal based on the power received from the power source to a load, and
a power converter that is configured to receive the AC power or current signal from the AC distribution network, wherein the power converter includes a power converter controller that is configured to control operation of the power converter,
wherein one of the transport refrigeration system controller and the power converter controller is configured to monitor the AC power or current signal to the power converter,
wherein one of the transport refrigeration system controller and the power converter controller is configured to calculate a power factor adjustment based on the monitored AC power or current signal, and
wherein the power converter controller is configured to adjust the power converter based on the calculated power factor adjustment to cause the power converter to supply a reactive current to the load such that the load receives the reactive current in addition to the AC power or current signal.

18. The transport refrigeration system of claim 17, wherein the AC power or current signal is one of a three phase AC current signal inputted to the power converter and a three phase AC power signal inputted to the power converter.

19. The transport refrigeration system of claim 17, wherein the power converter is configured to adjust the power factor closer to a unity power factor where a current of the AC power or current signal and a voltage of the AC power or current signal are in phase.

20. The transport refrigeration system of claim 17, wherein the power converter is configured to excite an electric machine that supplies the power to the AC distribution network.

* * * * *